(12) United States Patent
Wotherspoon

(10) Patent No.: US 12,236,420 B2
(45) Date of Patent: Feb. 25, 2025

(54) CARD READER VERIFICATION

(71) Applicant: NCR Corporation, Atlanta, GA (US)

(72) Inventor: Brian Steven Wotherspoon, Fife (GB)

( * ) Notice: Subject to any disclaimer, the term of this patent is extended or adjusted under 35 U.S.C. 154(b) by 20 days.

(21) Appl. No.: 17/361,768

(22) Filed: Jun. 29, 2021

(65) Prior Publication Data

US 2022/0414650 A1    Dec. 29, 2022

(51) Int. Cl.
*G06Q 20/38* (2012.01)
*G06Q 20/34* (2012.01)
*G06Q 20/40* (2012.01)

(52) U.S. Cl.
CPC .......... *G06Q 20/382* (2013.01); *G06Q 20/34* (2013.01); *G06Q 20/401* (2013.01); *G06Q 2220/00* (2013.01)

(58) Field of Classification Search
CPC .................................................. G06Q 20/382
USPC .......................................................... 705/75
See application file for complete search history.

(56) References Cited

U.S. PATENT DOCUMENTS

| | | | |
|---|---|---|---|
| 9,652,640 B1 * | 5/2017 | White | G06K 13/085 |
| 11,205,164 B1 * | 12/2021 | Wall | G06Q 20/204 |
| 2013/0333011 A1 * | 12/2013 | Quigley | G06Q 20/322 726/7 |
| 2018/0096330 A1 * | 4/2018 | Hamilton | G06Q 20/20 |
| 2021/0081932 A1 * | 3/2021 | Chau | G06Q 20/027 |
| 2021/0320918 A1 * | 10/2021 | Mars | H04L 63/0807 |
| 2022/0180711 A1 * | 6/2022 | Blackford | G06Q 20/4012 |

* cited by examiner

*Primary Examiner* — Chinedu C Agwumezie
(74) *Attorney, Agent, or Firm* — Schwegman Lundberg & Woessner, P.A.

(57) ABSTRACT

A card reader of a terminal is cryptographically verified upon initialization, power up, connection, or start of day processing of the terminal. A cryptographic and signed token is provided from and verified by an Encrypted Personal Identification Number (PIN) pad (EPP) of the terminal. Each time the reader initializes, the token is verified by the EPP and a new token is generated and provided to the reader for use during a next initialization cycle of the reader. If the reader lacks a token when the EPP has record that is should have the token, the reader is not authorized to perform card transactions for the terminal. If a token provided by the reader during an initialization cycle is not verified, the reader is not authorized to perform card transactions for the terminal.

19 Claims, 7 Drawing Sheets

CARD READER VERIFICATION

BACKGROUND

Payment card skimmers are a substantial problem in the industry especially since more and more transaction terminals are self-service where the customer performs the transaction and inserts a payment card for self-pay to complete the transaction.

Typically, the point of having a Self-Service Terminal (SST) is to reduce staffing requirements of a business and speed up checkouts of customers through the business. Moreover, a single employee is often responsible for assisting or monitoring all of a businesses SSTs. As a result, employees do not continuously monitor these terminals for the presence of skimmers and in many environments it would be infeasible to do so, such as outside Automated Teller Machines (ATMs), fuel pumps, and kiosks used for a variety of products (such as movie rentals, food and beverage, etc.).

A skimmer is a very thin and small electronic device that is inserted by a thief into the card slot of a card reader for the SST. The skimmer then reads the card information off the magnetic strip on the card and transmits the information to a remote source location for the thief to obtain. Even transactions that read card information off an embedded chip in the card will still, in most cases, also read the magnetic strip as a fall back to the chip read.

Most attempts to thwart skimmers have been directed to adding hardware or rearranging the electromechanical components of the card reader itself. But this is expensive and labor intensive requiring each existing card reader of each SST to be swapped out with a redesigned or an updated card reader. Most hardware-based solutions have been directed to adding sensors into the path of the card transport of the card readers. When a transaction is not being performed at the terminal if the sensor reports the presence of an obstruction, this is a pretty good indication that a skimmer is present, and the card reader is disabled on the SST. However, thieves have just redesigned the layout and size of their skimmers so as to avoid the locations within the card reader of the sensors, which renders the hardware redesign for the reader useless.

Moreover, thieves have become more brazen in their attempts to steal card information from SSTs. A recent trend is to physically remove the card readers from the terminals and insert a deep insert skimmer into the card readers; the card readers are then placed back into the terminals. This approach allows the thief to rearrange the components of the deep insert skimmer to be certain that the embedded sensors are unable to detect the presence of the skimmer. Furthermore, these type of skimmers cannot be detected simply by looking inside the slot an installed card reader or looking around the shutter slot of the card reader. That is, deep insert skimmers are likely only detectable if the card reader is removed and inspected, which does not occur, or which occurs very infrequently.

Consequently, deep insert skimmers pose a significant threat to retailers in the industry.

SUMMARY

In various embodiments, a system and a method for card reader verification are presented.

According to an aspect, a method for card reader verification is presented. An Encrypted Personal Identification Number (PIN) Pad (EPP) of a terminal receives a card reader authorization request to authorize a card reader to the terminal for operation. The EPP processes cryptographic operations on card reader data and sends an authorized message or a rejected message back to the terminal to authenticate or to reject the card reader for operation within the terminal based on the processing of the cryptographic operations.

DETAILED DESCRIPTION

Figure 1A:
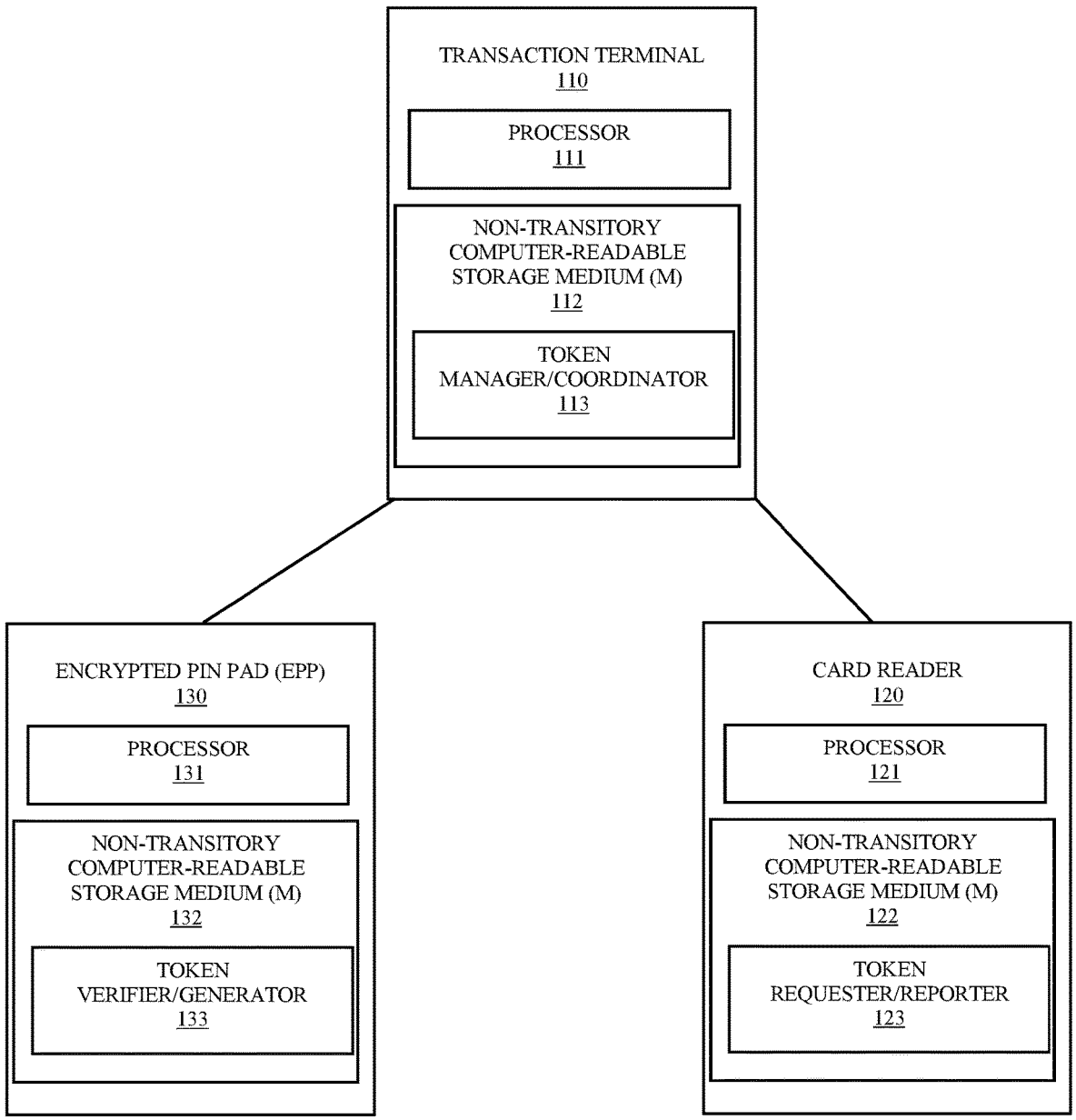
FIG. 1A is a diagram of a system for card reader verification, according to an example embodiment.

FIG. 1A is a diagram of a system 100 for card reader verification, according to an example embodiment. It is to be noted that the components are shown schematically in greatly simplified form, with only those components relevant to understanding of the embodiments being illustrated.

Furthermore, the various components (that are identified in FIG. 1A) are illustrated and the arrangement of the components is presented for purposes of illustration only. It is to be noted that other arrangements with more or less components are possible without departing from the teachings of card reader verification presented herein and below.

As will be discussed in the various embodiments that follow, the teachings provide a cryptographic token approach by which another already secure peripheral device of a transaction terminal (an encrypted Personal Identification Number (PIN) pad) is used to generate, verify, and distributed cryptographic tokens to the card reader of the terminal.

When the card reader is initiated for start of day processing or powered on after having been removed and replaced with a deep insert skimmer, the card reader is checked to see if it has a token or not. If the card reader returns no token, one is generated and supplied to the card reader after an independent authorization to generate the new token is obtained by the EPP; if independent authorization is not obtained by the EPP, the card reader is deactivated. If the card reader returns a token at the start of day or power on, the token is checked, if valid, the card reader is authorized and a new updated token is supplied to the card reader; if the reader provided token is invalid, the card reader is deactivated. The tokens include a variety of cryptographic information including a sequential number, such that the card reader may only request a new token once per day during startup processing, if the card reader requests a new token more than once in the day, the EPP requires independent authorization before the card reader is authorized for use by the terminal.

This prevents deep insert skimmers from being inserted into the card reader by a thief removing the card reader and placing the skimmer in the reader because when this occurs and the reader is reinitiated/reconnected with the terminal, the token is requested and verified. If no token is supplied but the EPP has a token for the reader, the card reader is deactivated. If a token is supplied but its sequence number indicates that the request for a new token is occurring a second time for the day, the EPP has to get independent authorization before the card reader is authorized for use. If a token is supplied but an expected serial number for the card reader is wrong, the card reader is deactivated.

Various embodiments of the teachings are now presented with references to FIGS. 1A-1E and 2-3.

System 100 comprises a transaction terminal 110, a card reader 120, and an EPP (encrypted PIN pad) 130. The card reader 120 and the EPP 130 are peripheral device integrated within and interfaced to terminal 110.

Terminal 110 includes a processor 111 and a non-transitory computer-readable storage medium 112. Medium 112 comprises executable instructions for a token manager/coordinator 113. The executable instructions when executed by processor 111 from medium 133 causes processor 111 to perform the operations discussed herein and below for token manager/coordinator 113.

Card Reader 120 comprises a processor 121 and a non-transitory computer-readable storage medium 122. Medium 122 comprises executable instructions for a token requestor/reporter 123. The executable instructions when provided to and executed by processor 121 from medium 122 cause processor 121 to perform the operations discussed herein and below for token requestor/coordinator 123.

EPP 130 comprises a processor 131 and a non-transitory computer-readable storage medium 132. Medium 132 comprises executable instructions for a token verifier/generator 133. The executable instructions when provided to and executed by processor 131 from medium 132 cause processor 131 to perform the operations discussed herein and below for token verifier/generator 133.

Token manager/coordinator 113 drives initiation of interactions between terminal 110, reader 120, and EPP 130 during a start of a day initialization or boot process of the reader 120 (note this includes when reader 120 is powered on after having been disconnected from terminal 110 and reconnected to terminal 110).

As used herein, "start of day processing" refers to a daily initialization, boot, or powering on reader 120 such that reader 120 is being connected and powered on for interaction with terminal 110 for performing card payment transactions.

There are four different processing during start of day processing illustrated in FIGS. 1B-1E, each of these will be discussed in turn below.

Figure 1B:
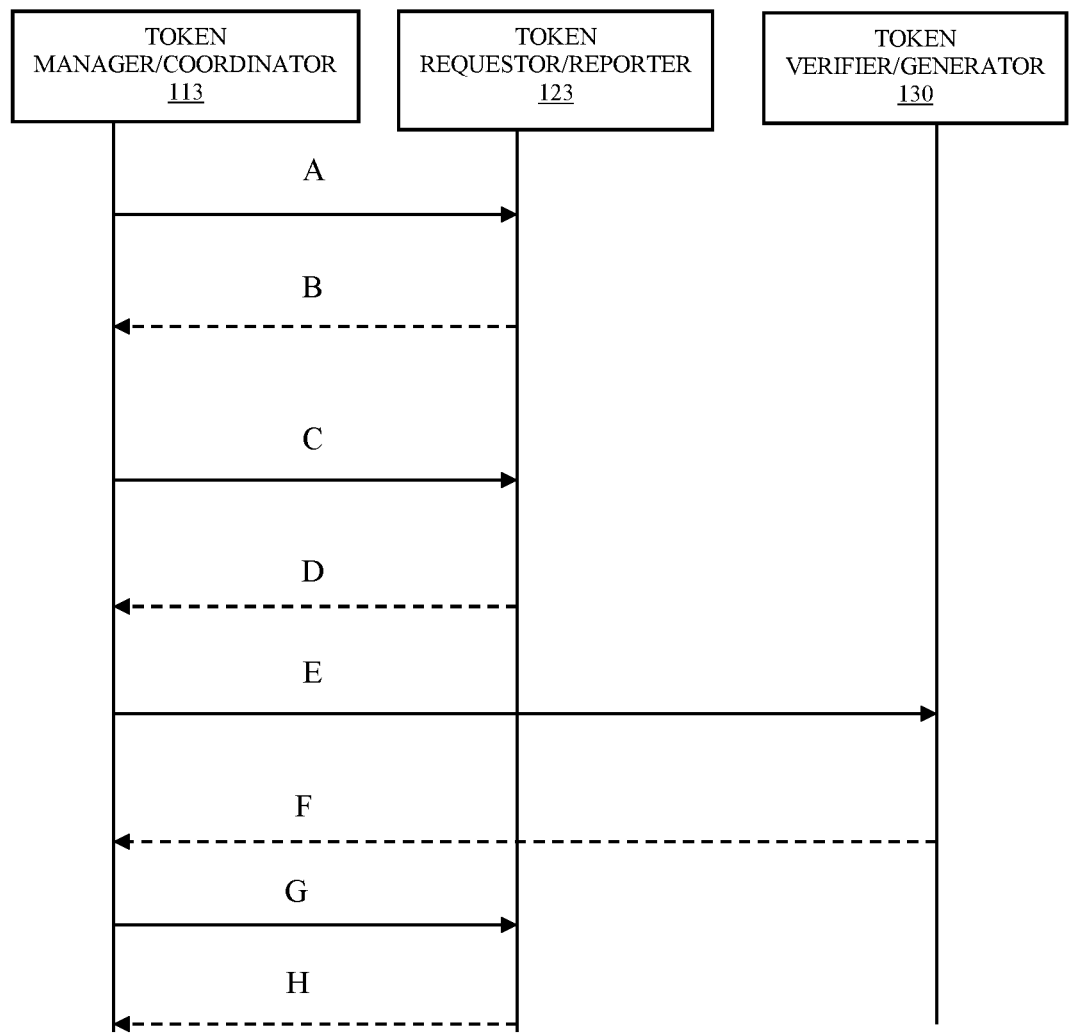
FIG. 1B is a diagram illustrating a process flow for system 100 for which an initial cryptographic token is provided to the card reader, according to an example embodiment.

FIG. 1B illustrates a process flow during the start of day processing for a card reader 120 that is being installed for a first time and has not previously been issued any tokens from verifier/generator 133 of EPP 130.

At A, token manager/coordinator 113 has identified an event indicating that card reader 120 is being connected, powered on, and/or booted for start of day processing. Manager/coordinator 113 sends a message requesting a token be returned by requestor/reporter 123 of reader 120.

At B, requestor/reporter 123 has identified that there are now stored tokens that can be sent; thus, a message is returned to manager/coordinator 113 indicating "no token" available to send.

At C, manager/coordinator 113 sends a message back to requestor/reporter 123 that a new token is being requested for reader 120.

At D, requestor/reporter 123 returns the reader's serial number and a randomly generated number as information needed to generate a token.

At E, manager/coordinator 113 sends a message to verifier/generator 133 requesting a token for reader 120 and provides as input to the token generation the random number and the reader's serial number.

In response to E, verifier/generator 133 of EPP 133 determines that the EPP has no recorded token that was ever issued for the serial number associated with reader 120. This is an indication that a new reader 120 is being installed on terminal 110. Thus, verifier/generator 133 requests that an authorization PIN be entered on the keypad of the EPP or requests a remote online authorization message be provided through the terminal that can be cryptographically verified by the verifier/generator 133. Assuming authorization is received, verifier/generator 133 generates or builds the token as a cryptographic token that concatenates the random number and the serial number of reader 120. Verifier/generator 133 starts a counter associated with that serial number as a sequence number that will be maintained and appends the sequence number onto the concatenated string of the random number and the serial number. Next, the resulting string (serial number+random number+sequence number) represents a token, which is they encrypted with a symmetric key generated and stored only on the EPP 130 to produce an encrypted token. The unencrypted version of the token is stored on the EPP 130.

At F, verifier/generator 133 signs the encrypted token with a signature of the EPP 130 and sends the signed and encrypted token back to manager/coordinator 113.

At G, manager/coordinator 113 sends the signed and encrypted token to requestor/reporter 123 of reader 120 where requestor/reporter 123 stores the signed and encrypted token in non-volatile storage for reporting back to manager/coordinator 113 during start of day processing each day.

At H, requestor/reporter 123 sends a message back to manager/coordinator 113 indicating that reader 120 is now authorized to operated for card transactions on terminal 110.

Figure 1C:
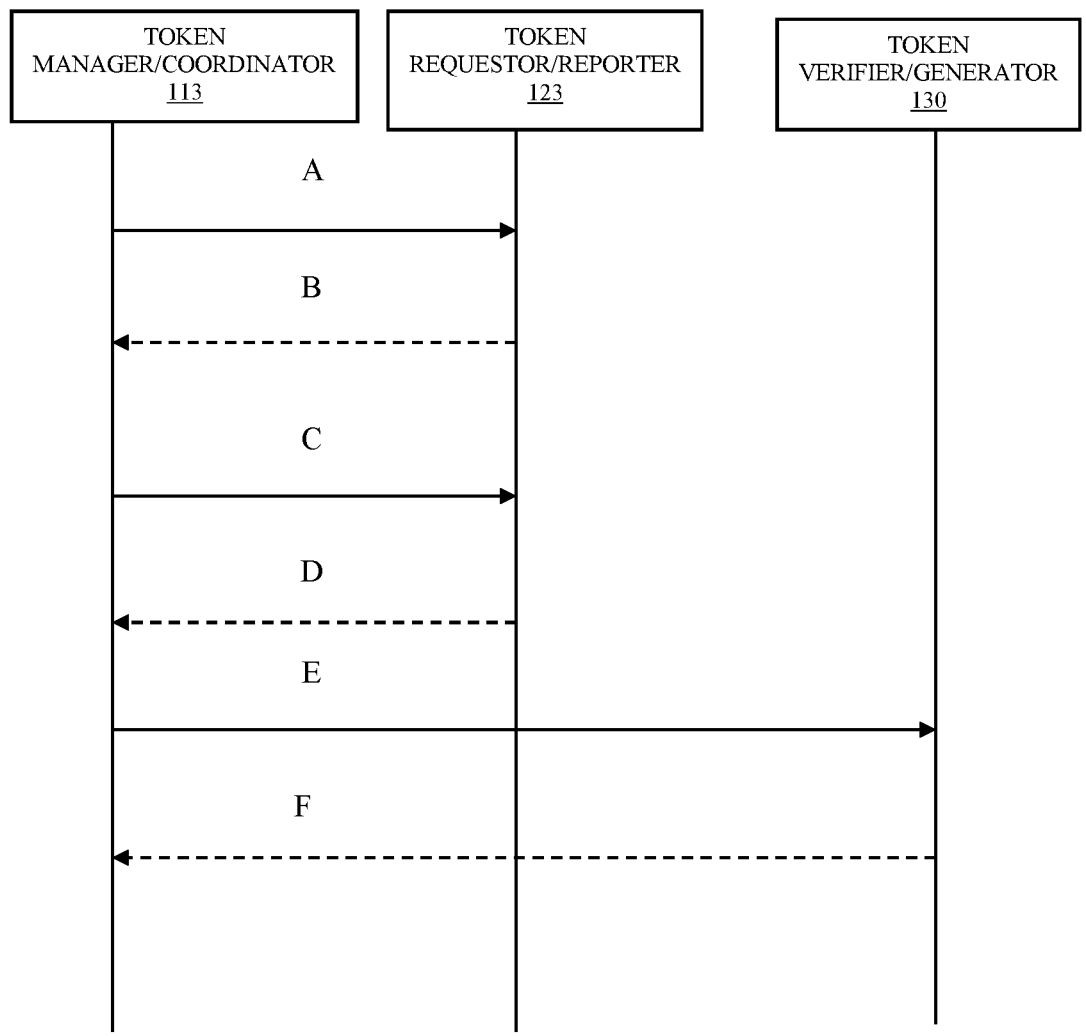
FIG. 1C is a diagram illustrating a process flow for system 100 for which a request for a new token by the card reader is rejected, according to an example embodiment.

FIG. 1C illustrates a process flow during the start of day processing for a card reader 120 that is being installed for a first and for which authorization fails.

At A, manager/coordinator 113 requests requestor/reporter 123 provide a token.

Having determined that there is no token to provide, at B, requestor/reporter 123 reports back that there is no token.

At C, manager/coordinator 113 requests a random number and a serial number from requestor/reporter 123.

At D, requestor/reporter 123 returns its serial number and a random number.

At E, manager/coordinator 113 requests a new token of verifier/generator 133 by providing the random number and the serial number. Verifier/generator 133 inspects the serial number and if there is already a previous token that verifier/generator 133 knows was sent to reader 120, rejects the request at F. Alternatively, even when there is no recorded previous token for the serial number of reader 120, the independent authorization via an entered PIN on the keypad of EPP 130 is entered incorrectly or the verifier/generator 133 is unable to receive nor cryptographically verify any independent online authorization message provided through terminal 110 to verifier/generator 133. As a result, at F, the request for the new token for the serial number associated with reader 120 is rejected. In this case, the terminal 110 is unable to start the platform that requires usage of the card reader 120 and the issue will have to be addressed. Here, a service engineer dispatched to the terminal 110 will remove reader 120 and may determine that a deep insert skimmer was inserted into the reader 120 and remove the skimmer and try the process again, this time with a valid PIN entered into the keypad of the EPP, such that verifier/generator 133 can authorize the reader 120 and terminal 110 can start up normally for transaction processing.

Figure 1D:
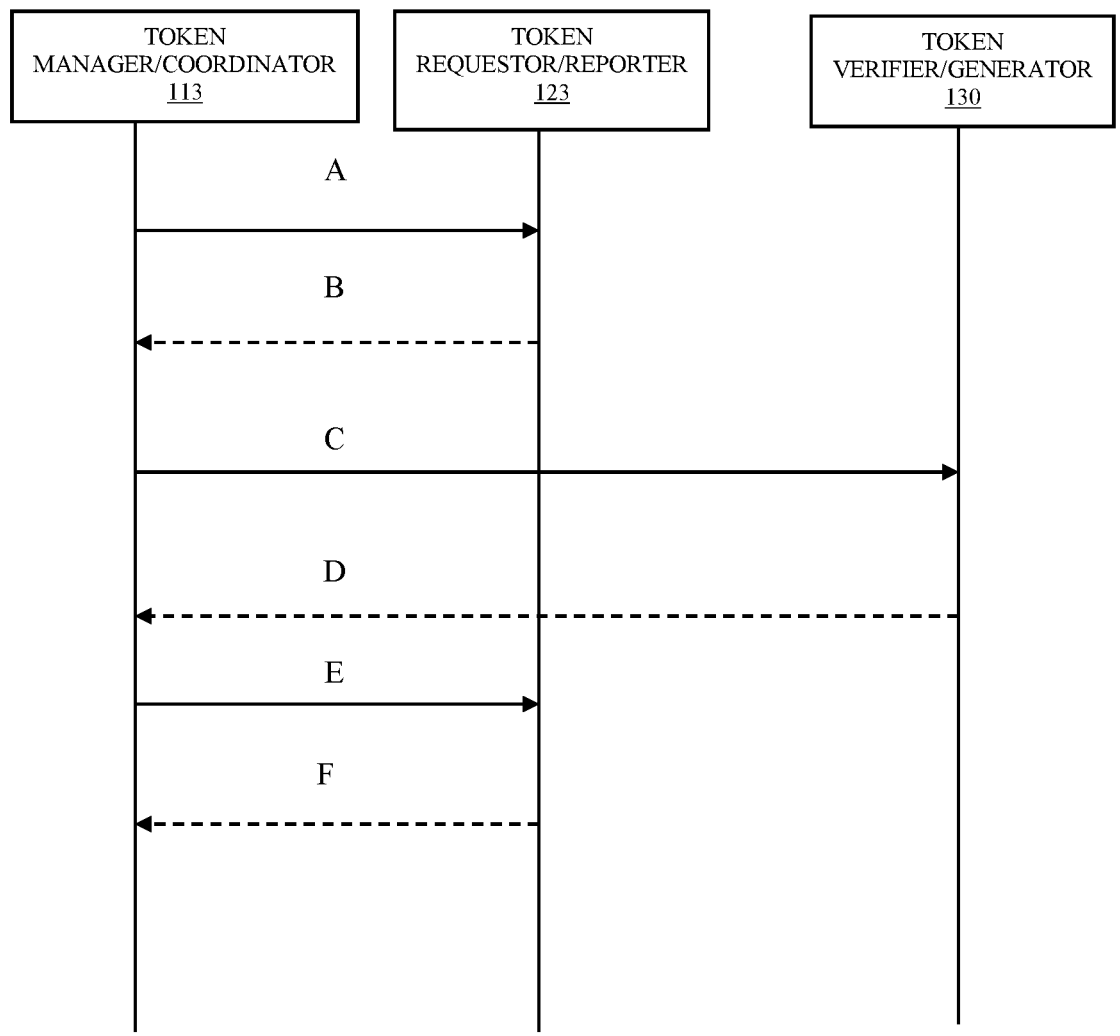
FIG. 1D is a diagram illustrating a process flow for system 100 for which a request for a new token by the card reader includes a last provided token that is rejected, according to an example embodiment.
Figure 1E:
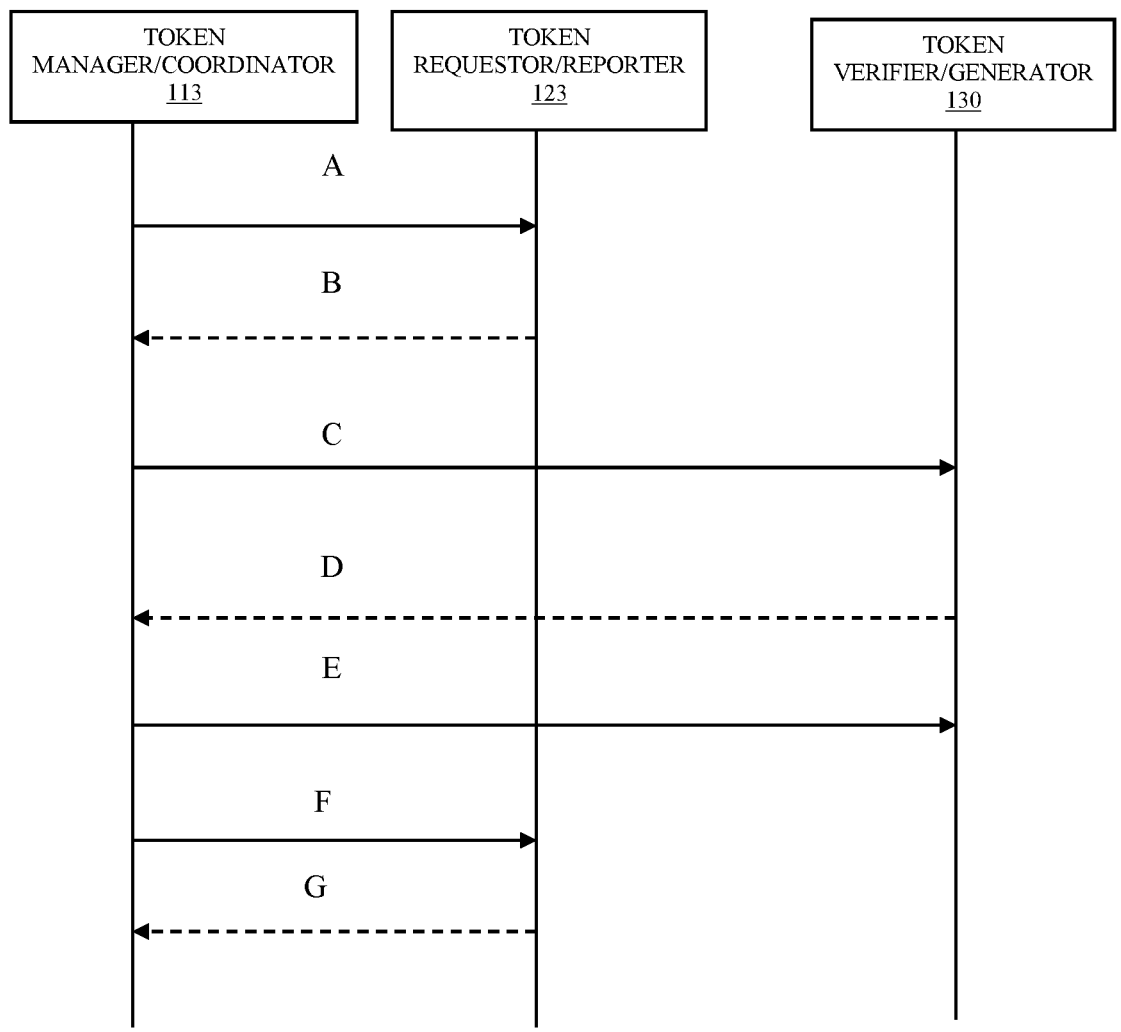
FIG. 1E is a diagram illustrating a process flow for system 100 for which a request for a new token by the card reader includes a last provided token that is authorized, and the new token is returned to the card reader, according to an example embodiment.

FIG. 1D illustrates a process flow during the start of day processing for a card reader 120 for which a request for a new token by the card reader includes a last provided token that is rejected, according to an example embodiment.

At A, manager/coordinator 113 requests a token from requestor/reporter 123.

At B, requestor/reporter 123 determines that there is a stored token to return and returns it to manager/coordinator 113 along with a randomly generated number.

At C, manager/coordinator 113 requests that verifier/generator 133 verify the token by providing the token and the random number. Verifier/generator 133 decrypts the token using the symmetric key stored only on EPP 133. The serial number is checked from the decrypted token against what was stored for reader 120 on EPP 130. If the serial numbers do not match between what was stored and what was decrypted from the encrypted token supplied by manager/coordinator 113, the request is rejected. And a rejection is sent back to manager/coordinator 113 at D. It may also be that verifier/generator 133 is unable to decrypt the token provided with the symmetric key, this also results in a rejection message being sent at D. Still further, a policy evaluated by verifier/generator 133 may indicate that only 1 new token may be requested per day or per a predefined period of time from when the last recorded token was issued. Any violation in policy, will also result in the rejection being sent at D. This ensures that if the token was corrupted, copied to a different reader, or the request is received too soon based on policy that the token verification fails on EPP 130. So, a thief could not disconnect the reader 120, insert a deep insert skimmer, and reconnect the reader 120 for operation because verifier/generator 133 will detect such actions through corrupted tokens and/or through requests that are not in sequence (based on the sequence number in the encrypted token and what is stored as the sequence number) or are being requested too soon. A manual or online verification would be needed if the card reader 120 needs to be used with the terminal 110.

At E, manager/coordinator 113 sends a message to requestor/reporter 123 to erase its stored token, which is invalid and unverified. Requestor/Reporter 123 deletes and removes the stored token and responds back to manager/coordinator 113 that is out of service and unavailable for any card transactions on terminal 110.

FIG. 1D illustrates a process flow during the start of day processing for a card reader 120 for which a request for a new token by the card reader 120 includes a last provided token that is authorized, and the new token is returned to the card reader 120.

At A, manager/coordinator 113 requests that requestor/reporter 123 return any stored token.

At B, requestor/reporter 123 detects a stored token and returns it to manager/coordinator 113 along with a randomly generated number.

At C, manager/coordinator 113 provides the token to verifier/generator 133 for verification along with the random number. Verifier/Generator 133 decrypts the token using the internal symmetric key stored on EPP 130. The serial number is verified against the stored serial number of the EPP. The sequence number is verified, and any policy evaluated to ensure that the request is not in violation of the policy. Assuming the verification is successful, verifier/generator 133 increments the sequence number stored for the token, concatenates the random number received at C with the serial number and with an incremented value in the current sequence number. The resulting string is then encrypted with the internal symmetric key and signed by verifier/generator 133.

At D, verifier/generator 133 returns a token verified message and the new encrypted and signed token for reader 120 to manager/coordinator 113.

At E, manager/coordinator 113 sends the new encrypted and signed token to requestor/reporter 123 of reader 120 where requestor/reporter 123 stores the encrypted and signed token in non-volatile storage on reader 120.

At F, requestor/reporter 123 returns an authorization successful message and is initialized for performing card transaction on terminal 110.

One now appreciates how a card reader 120 can be securely and cryptographically verified each time it is initiated, booted, or powered on to verify that there has been no tampering related to a deep insert skimmer. This approach requires no hardware modifications or changes in architectures of the terminal 110, reader 120, nor EPP 130.

The above-referenced embodiments and other embodiments are now discussed with reference to FIGS. 2-3.

Figure 2:
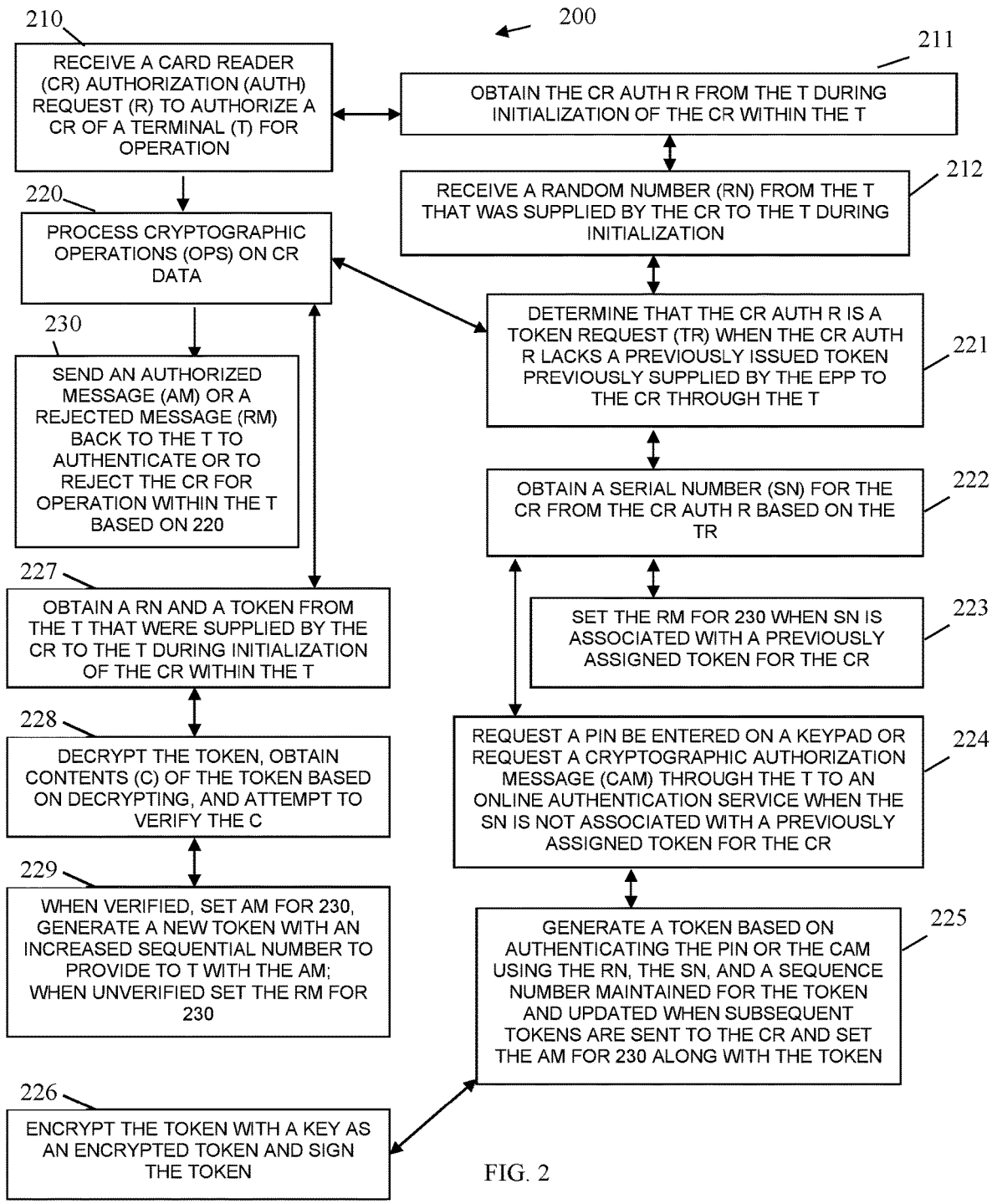
FIG. 2 is a diagram of a method for card reader verification, according to an example embodiment.

FIG. 2 is a diagram of a method 200 for secure card reader verification, according to an example embodiment. The software module(s) that implements the method 200 is referred to as "card reader verifier." The card reader verifier is implemented as executable instructions programmed and residing within memory and/or a non-transitory computer-readable (processor-readable) storage medium and executed by one or more processors of one or more devices. The processor(s) of the devices that executes the card reader verifier are specifically configured and programmed to process the card reader verifier. The card reader verifier may or may not have access to one or more network connections during its processing. Any network connections can be wired, wireless, or a combination of wired and wireless.

In an embodiment, the card reader verifier is executed by an EPP peripheral of a transaction terminal. In an embodiment, the EPP is EPP 130 and the terminal is terminal 110. In an embodiment, the terminal 110 is a Self-Service Terminal (SST), an ATM, a Point-Of-Sale (POS) terminal, or a kiosk.

In an embodiment, the card reader verifier is the verifier/generator 133.

At 210, the card reader verifier receives a card reader authorization request to authorize a card reader of a terminal for operation within and connection to the terminal.

In an embodiment, at 211, the card reader verifier obtains the card reader authorization request from the terminal during an initialization of the card reader within the terminal.

In an embodiment of 211 and at 212, the card reader verifier receives a random number from the terminal that was supplied by the card reader to the terminal during initialization.

At 220, the card reader verifier processes cryptographic operations on the card reader data.

In an embodiment of 212 and 220, at 221, the card reader verifier determines that the card reader authorization request is a token request when the card reader authorization request lacks a previously issued token, which was previously supplied by the EPP to the card reader through the terminal.

In an embodiment of 221 and at 222, the card reader verifier obtains a serial number for the card reader from the card reader authorization request based on the token request.

In an embodiment of 222 and at 223, the card reader verifier sets the rejected message for 230 when the serial number is associated with a previously assigned and issued token for the card reader. This indicates that the card reader verifier has a record of issuing a token to this card reader and the authorization is denied because the card reader did not supply the previously issued token with the request for authorization.

In an embodiment of 222 and at 224, the card reader verifier request a PIN be entered on a keypad by an operator of the terminal or requests a cryptographic authorization message through the terminal to an online authentication service when the serial number is not associated with a previously assigned or issued token for the card reader. This indicates that the card reader is a new reader being installed a first time on the terminal and independent authorization is required.

In an embodiment of 224 and at 225, the card reader verifier generates a token based on authenticating successfully the PIN or the cryptographic authorization message using the random number, the serial number and a sequence number maintained for the token and updated when subsequent tokens are sent to the card reader. The card reader verifier also sets the authorized message for processing at 230 and the token is to be supplied with the authorized message for storage on and subsequent retrieval from the card reader during subsequent initializations by the card reader within the terminal.

In an embodiment of 225 and at 226, the card reader verifier encrypts the token with a symmetric key stored only on and accessible only from the EPP. The encrypted token is then signed and provided with the authenticated message to the terminal at 230.

In an embodiment of 220 and at 227, the card reader verifier obtains a random number and a token from the terminal that were supplied by the card reader to the terminal during initialization of the card reader within the terminal.

In an embodiment of 227 and at 228, the card reader verifier decrypts the token to obtain contents and attempts to verify or authenticate the contents.

In an embodiment of 228 and at 229, when the card reader verifier verifies the contents, the card reader verifier sets the authenticated message for 230 and generates a new token with an incremented sequential number for providing to the terminal with the authenticated message. When the card reader verifier does not verify the contents (unverified contents, the card reader verifier, the card reader verifier sets the rejected message for 230.

At 230, the card reader verifier sends the authorized message or the rejected message back to the terminal to authenticate or to reject the card reader for operation within the terminal based on 230.

Figure 3:
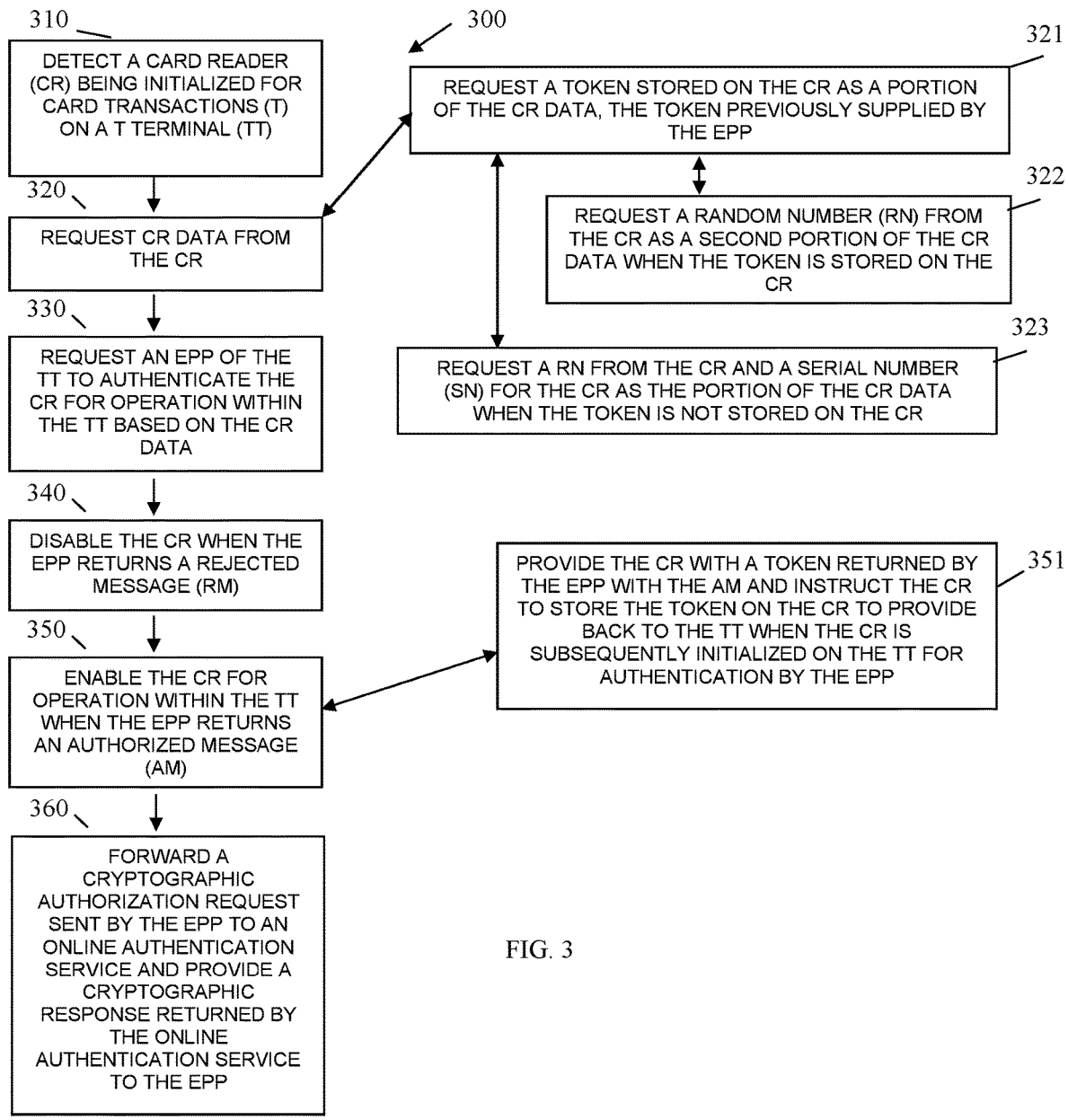
FIG. 3 is a diagram of another method for card reader verification, according to an example embodiment.

FIG. 3 is a diagram of another method 300 for secure card reader verification, according to an example embodiment. The software module(s) that implements the method 300 is referred to as "terminal card reader authorization coordinator." The terminal card reader authorization coordinator is implemented as executable instructions programmed and residing within memory and/or a non-transitory computer-readable (processor-readable) storage medium and executed by one or more processors of one or more devices. The processor(s) of the device(s) that executes the terminal card reader authorization coordinator are specifically configured and programmed to process the terminal card reader authorization coordinator. The terminal card reader authorization coordinator may or may not have access to one or more network connections during its processing. Any network connections can be wired, wireless, or a combination of wired and wireless.

In an embodiment, the device that executes the terminal card reader authorization coordinator is a transaction terminal. In an embodiment, the transaction terminal is terminal 110. In an embodiment, the terminal 110 is a SST, an ATM, a POS terminal, or a kiosk.

In an embodiment, the terminal card reader authorization coordinator is the token manager/coordinator 113.

The terminal card reader authorization coordinator interacts with token verifier/generator 133 and/or method 200 and with token requestor/reporter 123 for purposes of authorizing or rejecting a connection request, power up, boot, and/or initialization (start up process) of a card reader for use as a peripheral device to perform card transactions during transactions being performed on a transaction terminal.

At 310, the terminal card reader authorization coordinator detects a card reader being initialized for card transactions on a transaction terminal.

At 320, the terminal card reader authorization coordinator requests card reader data from the card reader.

In an embodiment, at 321, the terminal card reader authorization coordinator requests a token stored on the card reader as a portion of the card reader data. The token, if present, was previously generated and provided to the transaction terminal and stored on the card reader.

In an embodiment of 321 and at 322, the terminal card reader authorization coordinator request a random number from the card reader as a second portion of the card reader data when the token was present and was stored on the card reader at 321.

In an embodiment of 321 and at 323, the terminal card reader authorization coordinator requests a random number and a serial number for the card reader as the portion of the card reader data when the token is not stored on and available from the card reader.

At 230, the terminal card reader authorization coordinator requests an EPP of the transaction terminal to authenticate the card reader for operation within the transaction terminal based on the card reader data.

At 340, the terminal card reader authorization coordinator disables the card reader with the EPP returns a rejected message.

At 350, the terminal card reader authorization coordinator enables the card reader for operation within the transaction terminal when the EPP returns an authorized message.

In an embodiment, at 351, the terminal card reader authorization coordinator provides the card reader with a token returned by the EPP with the authenticated message and instructs the card reader to store the token on the card reader and provide back to the transaction terminal when the card reader is subsequently initialized on the transaction terminal for authentication by the EPP.

In an embodiment, at 360, the terminal card reader authorization coordinator forwards a cryptographic authorization requests sent by the EPP to an online authentication service and provides a cryptographic response returned by the cryptographic online authentication service to the EPP. In this case, the EPP is requesting independent authorization and is not using a PIN entered by an operator of the transaction terminal on the keypad of the EPP for the independent authorization.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving, by an Encrypted Personal Identification Number (PIN) Pad (EPP) of a terminal, a card reader authorization request to authorize a card reader of the terminal for operation, wherein the card reader authorization request is initiated by the card reader upon each power-on sequence and provided to the terminal each time the card reader is powered on for operation with the terminal, wherein the EPP and the card reader are integrated within the terminal as integrated peripheral devices of the terminal, wherein the terminal is an automated teller machine or a self-service terminal, wherein the EPP and card reader are separate and independent peripherals of the terminal;
processing, by the EPP, cryptographic operations on card reader data including validating a cryptographic token associated with the card reader; and
sending, by the EPP, an authorized message or a rejected message back to the terminal to authenticate or to reject the card reader for operation within the terminal based on the processing, wherein the rejected message is provided back to the terminal when the card reader authorization request is generated by the card reader more than once a single day, and wherein the processing further includes verifying the cryptographic token against a previously issued token by the EPP, wherein the cryptographic token is encrypted with a symmetric key stored only on and accessible only from the EPP.

2. The method of claim 1, wherein receiving further includes obtaining the card reader authorization request from the terminal upon initialization of the card reader within the terminal.

3. The method of claim 2, wherein obtaining further includes receiving a random number from the terminal supplied by the card reader to the terminal during the initialization.

4. The method of claim 3, wherein processing further includes determining that the card reader authorization request is a token request when the card reader authorization request lacks the previously issued token previously suppled by the EPP to the card reader through the terminal.

5. The method of claim 4, wherein determining further includes obtaining a serial number for the card reader from the card reader authorization request based on the token request.

6. The method of claim 5, wherein obtaining the serial number further includes setting the rejected message for the sending to the terminal when the serial number is associated with a previously assigned token for the card reader.

7. The method of claim 6, wherein obtaining the serial number further includes requesting a PIN be entered on a keypad of the EPP or requesting a cryptographic authorization message through the terminal to an online authentication service when the serial number is not associated with the previously assigned token for the card reader.

8. The method of claim 7, wherein requesting further includes generating a token based on authenticating the PIN or the cryptographic authorization message using the random number, the serial number, and sequence number maintained for the token and updated when subsequent tokens are sent to the card reader and setting the authorized message for the sending to the terminal along with the token.

9. The method of claim 8, wherein generating the token further includes encrypting the token with a key stored on the EPP as an encrypted token and digitally signing the encrypted token.

10. The method of claim 1, wherein processing further includes obtaining a random number and the cryptographic token from the terminal that were supplied by the card reader to the terminal during initialization of the card reader within the terminal.

11. The method of claim 10, wherein obtaining further includes decrypting the cryptographic token, obtaining contents of the token based on the decrypting, and attempting to verify the contents.

12. The method of claim 11, wherein attempting to verify further includes:
setting the authorized message for the sending to the terminal when the contents are verified and generating a new token with an increased sequential number that is provided with the authorized message to the terminal during the sending to the terminal; and
setting the rejected message for the sending to the terminal when the contents are not verified.

13. A method, comprising:
detecting, by a transaction terminal, a card reader being initialized for card transactions on the transaction terminal, wherein the card reader provides a card reader authorization request to the terminal each time the card reader is powered on for operation with the terminal, wherein the card reader is integrated within the transaction terminal as a first integrated peripheral device, wherein the transaction terminal is an automated teller machine or a self-service terminal;
requesting, by the transaction terminal, card reader data from the card reader, wherein the card reader data includes a cryptographic token;
requesting, by the transaction terminal, an Encrypted Personal Identification Number (PIN) Pad (EPP) of the transaction terminal to authenticate the card reader for operation with the transaction terminal based on the card reader data, wherein the EPP is integrated within the transaction terminal as a second integrated peripheral device, wherein the EPP and card reader are separate and independent peripherals of the transaction terminal, wherein the EPP is configured to perform cryptographic verification of the cryptographic token;
disabling, by the transaction terminal, the card reader when the EPP returns a rejected message, wherein the EPP returns the rejected message when the card reader is powered on more than once in a single day; and
enabling, by the transaction terminal, the card reader for operation within the transaction terminal when the EPP returns an authorized message based on the cryptographic verification, wherein the cryptographic token is encrypted with a symmetric key stored only on and accessible only from the EPP.

14. The method of claim 13 further comprising, forwarding a cryptographic authorization request sent by the EPP to an online authentication service and providing a cryptographic response returned by the online authentication service to the EPP.

15. The method of claim 13, wherein requesting the card reader data further includes requesting the cryptographic token stored on the card reader as a portion of the card reader data.

16. The method of claim 15, wherein requesting the cryptographic token further includes requesting a random number from the card reader as a second portion of the card reader data when the token is stored on the card reader.

17. The method of claim 15, wherein requesting the card reader data further includes requesting a random number from the card reader and a serial number for the card reader as the portion of the card reader data when the cryptographic token is not stored on the card reader.

18. The method of claim 3, wherein enabling further includes providing the card reader with the cryptographic token that was returned by the EPP with the authorized message and instructing the card reader to store the cryptographic token on the card reader to provide back the transaction terminal when the card reader is subsequently initialized on the transaction terminal for authentication by the EPP.

19. A system, comprising:
a transaction terminal;
a card reader connected to the transaction terminal as a first peripheral device of the transaction terminal, therein the card reader is integrated within the transaction terminal as a first integrated peripheral device, wherein the card reader is configured to generate a card reader authorization request each time the card reader is powered on for operation within the transaction terminal, wherein the card reader authorization request includes a cryptographic token; and
an Encrypted Personal Identification Number Pad (EPP) connected to the transaction terminal as a second peripheral device of the transaction terminal, wherein the EPP is integrated within the transaction terminal as a second integrated peripheral device, wherein the EPP and card reader are separate and independent peripherals of the transaction terminal, wherein the EPP is configured to perform cryptographic verification processing using the cryptographic token each time the card reader is powered on for operation with the transaction terminal;
wherein the transaction terminal is configured to:
obtain card reader data from the card reader each time the card reader is powered on for operation with the transaction terminal and the card reader supplies the terminal a card reader authorization request for operation, supply the card reader data to the EPP, receive a rejected message or an authenticated message back from the EPP based on the cryptographic verification processing, disable the card reader when the rejected message is received from the EPP, and enable the card reader when the authenticated message is received from the EPP;
wherein the card reader is configured to:
supply the card reader authorization request and the card reader data to the transaction terminal each time the card reader is powered on within the transaction terminal for operation;
wherein the EPP is configured to:
perform cryptographic verification processing using the card reader data each time the transaction terminal provides the card reader data for the card reader, obtain independent authorization when the card reader data indicates the card reader is connecting a first time to the transaction terminal, and provide the authenticated message or the rejected message based on the cryptographic verification processing, wherein the EPP provides the rejected message when the card reader is powered on more than once in a single day;
wherein the transaction terminal is a self-service terminal or an automated teller machine;
wherein the cryptographic token is encrypted with a symmetric key stored only on and accessible only from the EPP.

* * * * *